July 26, 1955 R. B. BERG 2,713,816
CULTIVATORS FOR ROW PLANTS
Filed June 29, 1954 3 Sheets-Sheet 1

INVENTOR
Robert B. Berg
BY
ATTORNEYS

July 26, 1955  R. B. BERG  2,713,816
CULTIVATORS FOR ROW PLANTS
Filed June 29, 1954  3 Sheets-Sheet 2
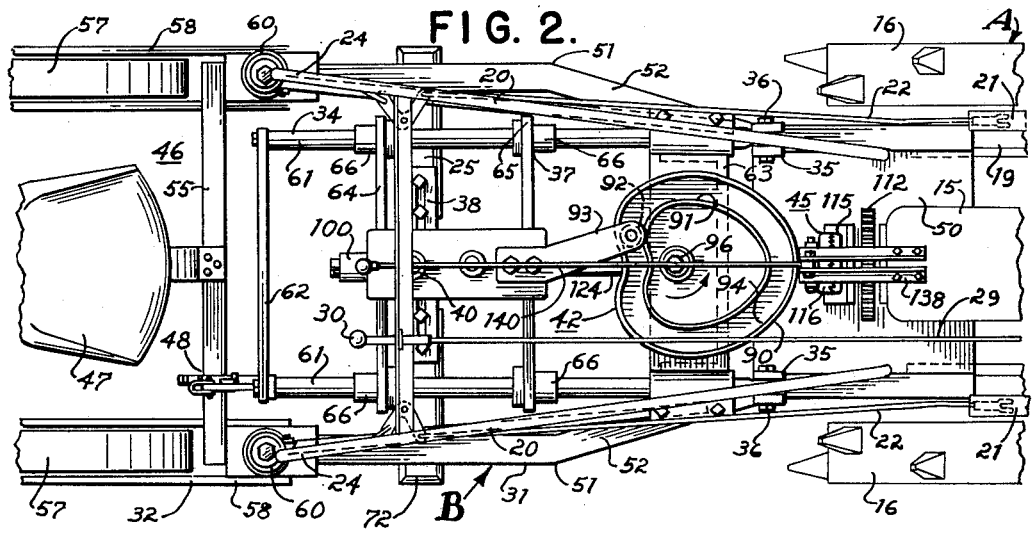
FIG. 2.
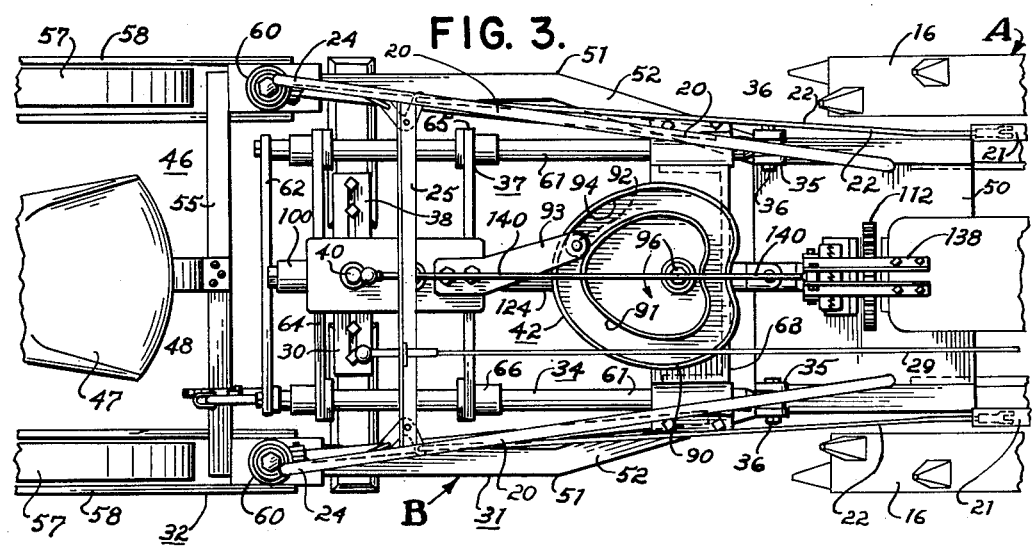
FIG. 3.
FIG. 6.
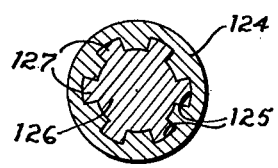
INVENTOR
Robert B. Berg
BY
ATTORNEYs

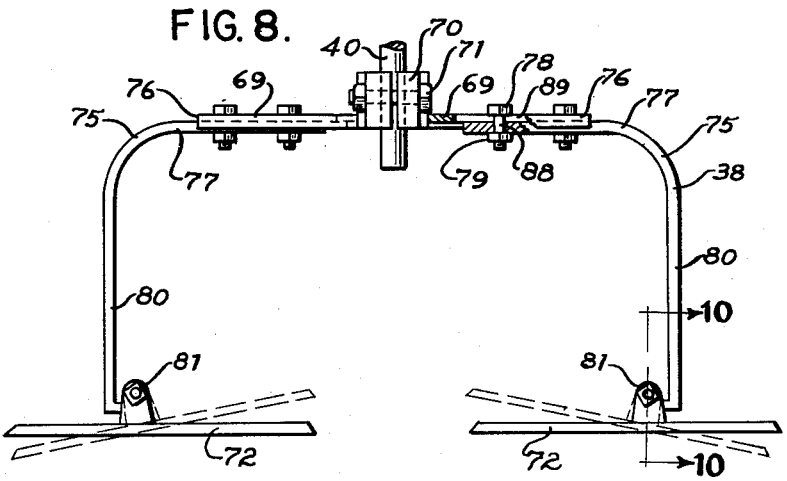
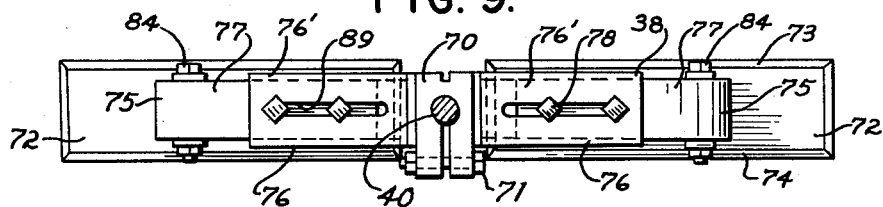
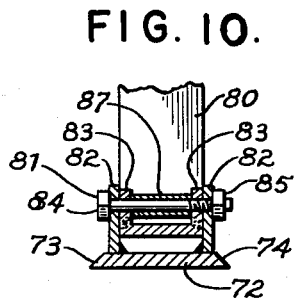
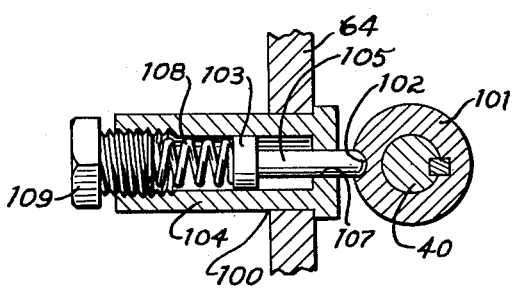
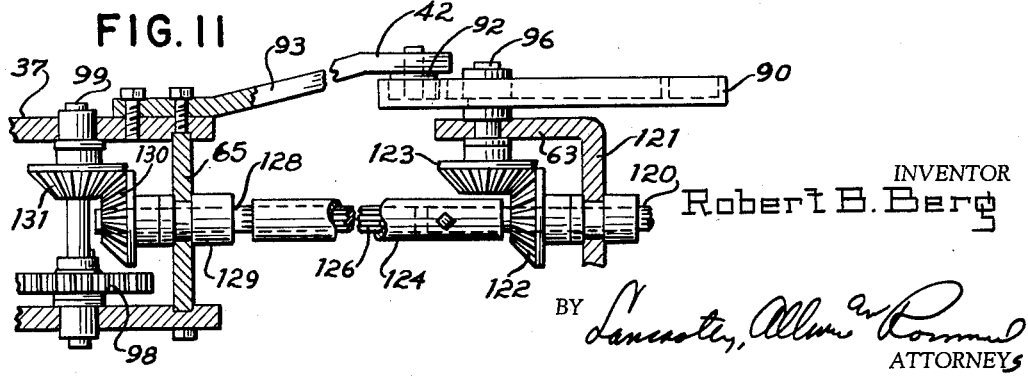

ated July 26, 1955

2,713,816

CULTIVATORS FOR ROW PLANTS

Robert B. Berg, near Samsula, Fla.

Application June 29, 1954, Serial No. 440,037

12 Claims. (Cl. 97—36)

This invention relates to cultivators for plants disposed in rows and in widely spaced relationship in each row such as head lettuce, cabbage, peppers, corn etc.

By the use of modern row-crop planters, the seeds or seedlings, as the case may be, are uniformly planted in spaced relation in the fields, which makes possible stirring the soil somewhat near the growing plants, by various types of cultivators, ranging all the way from the small hand-pushed garden cultivater to large four-row tractor-mounted cultivators. However, even with the use of such cultivators, it has been found necessary to hand cultivate near the stalks of the plants for most satisfactory results, and such hand cultivating is laborious and time consuming with a consequent increased cost in raising the crops.

The principal objects of this invention are to provide power operated cultivators which will not only cultivate between the rows of plants and between the plants in each row, but will also cultivate completely around (360°) the plants close to the stalks of the plants, thus making unnecessary the hand cultivation referred to, and which may travel steadily the full length of the rows of the plants, by the use of tractors; and, to provide such cultivators, each operated from the power take-off of its respective tractor, with parts constructed and arranged so as to not subject the tractor and parts of the cultivator to undue stresses and strains while operating.

The invention is applicable to small garden tractors such as of the type having only two power operated ground or traction wheels and in which steering is accomplished by selectively braking one or the other of the wheels. An example of such type tractor is disclosed in Patent 2,260,344 to Stanley W. Shaw. Or the cultivator may be applied to various makes and models of the larger types of four wheel tractors. With the larger tractors, a plurality of the cultivators, according to the present invention, may be applied for simultaneously cultivating the plants in a plurality of rows.

Other objects are to provide cultivators, the hoes of which each include two radially disposed, spaced apart blades revoluble horizontally about the plants and extend in close proximity to the stalks thereof, while the carriers of the hoes dwell above the individual plants being cultivated, and while the tractor is moving steadily on at a uniform speed; and to render the hoes adjustable as to depth of penetration in the soil, width of the orbit of rotation of each hoe, so as to effectively and economically cultivate, according to the spacing of the rows and the spacing of the plants in the row, and as to the angular relationship of the cutting edge of the hoe to the horizontal, as when it is desired to "hill" the plants.

An important feature of the invention is that the hoes are not elevated or bodily moved laterally in their movement from plant to plant. They are used to not only cultivate the soil in close proximity to the plant stalks, but also to cultivate the soil between the plants as well as the paths between the rows of plants.

Further objects and advantages will appear in the following detailed description of one embodiment of my invention used in connection with a garden tractor of the general type shown in said Patent 2,260,344 and taken in connection with the accompanying drawings, forming a part of this specification, and in which drawings:

Fig. 2 is an enlarged fragmentary plan view of the cultivator and a portion of the tractor showing the relative position of the parts as the hoe is about to revolve and dwell over the plant to be circumferentially cultivated, while the tractor and the carrying and operating parts for the hoe, move steadily forward along the row of plants.

Fig. 3 is a view similar to Fig. 2 but showing the relative position of parts at the end of circumferential cultivation of the plant and at the start of cultivation along the plant row and adjacent paths as the tractor and cultivator move steadily forward along the row.

Fig. 4 is an enlarged, fragmentary sectional view on the line 4—4 of Fig. 1, showing the relative position of parts as the hoe is about to have circumferential movement imparted to its spindle.

Fig. 5 is a view similar to Fig. 4 but showing the relative position of parts after the hoe has completed one revolution and is in readiness to be drawn forward to cultivate along the plant row.

Fig. 6 is an enlarged sectional view on the line 6—6 of Fig. 1 showing telescopically splined shafting.

Fig. 7 is an enlarged sectional view on the line 7—7 of Fig. 1 showing means for yieldably retaining the hoe with its blades crosswise the plant row as when used for cultivating along the row.

Fig. 8 is an enlarged view partly in elevation and partly in section showing the preferred type of hoe, with adjusting means for the extent of straddling relation with a plant and for the hoe blades.

Fig. 9 is a top plan view of the hoe, its operating spindle being shown in horizontal section.

Fig. 10 is a sectional view on the line 10—10 of Fig. 9.

Fig. 11 is an enlarged fragmentary detail view, partly in side elevation and partly in vertical section showing a portion of motion transmitting means whereby the hoe and associated movable parts are operated by the tractor power take-off.

Figure 1:
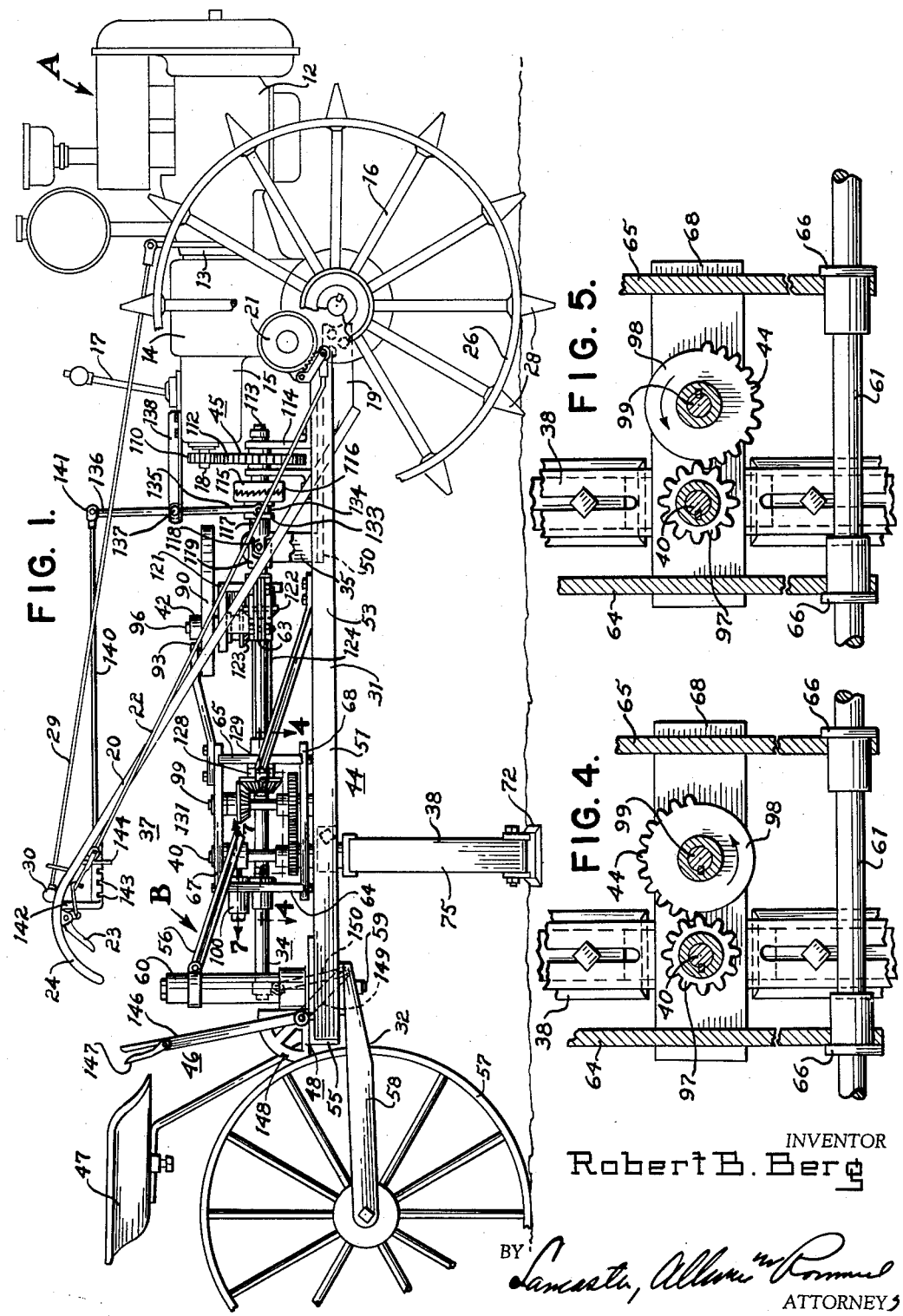
Fig. 1 is a side elevational view of the cultivator constructed according to the present invention, attached to and operated by a garden tractor of the type referred to, a portion of the tractor being broken away to show a typical connection of the cultivator to the draw bar support means thereof.

In the drawings A designates a mobile power operated unit, such as a tractor, and B the cultivator attached to and operated by the mobile unit.

The mobile unit A in this instance includes a main body portion comprising a forwardly extending engine 12, a clutch lever 13, an intermediate transmission housing 14 arched at its lower portion to clear the plants in the row, along which the mobile unit moves and a rearwardly extending gear set casing 15; and two power driven or traction wheels 16, independently rotatable through the usual differential not shown in the drawing. Selected speed ratio between the engine 12 and wheels 16 may be accomplished in the usual manner, through manipulation of a lever 17 mounted upon the casing 15.

The tractor also includes a rearwardly extending power take-off shaft 18, a draw bar support means 19 extending rearwardly from the housing 14, a pair of rearwardly extending handles 20 secured to the means 19, a brake mechanism 21 associated with each wheel 16, and control means 22 associated with each brake mechanism 21 and including a hand lever 23 adjacent the handhold portion 24 of the handle 20 which is at the side of the longitudinal axis of the tractor to which its associated brake mechanism 21 is located. The hand levers 23 may be supported by a cross brace bar 25 secured to the handles 20 adjacent the handhold portions 24 thereof in the conventional way. All of these characteristics of the tractor are well known in the art and generally shown in the aforesaid Patent 2,260,344. By manipulation of the hand lever 23 at either the right or left handhold portion 24 the associated brake mechanism 21 may be operated to stop or retard movement of the associated traction wheel 16 for steering the moving tractor to the right or to the left, as the case may be.

I prefer to utilize a tractor equipped with traction wheels each having a metal rim 26 provided with radially extending lugs or calks 28 finding such better, particularly for travel over sandy soil than wheels equipped with pneumatic tires, since the former are more positive in steadily advancing the tractor and equipment trailing same a positive distance for each revolution of the traction wheel than wheels with pneumatic tires which are often used with the tires improperly inflated.

The clutch lever 13 may be operated by a rod 29 pivoted thereto at one end, and having a knob 20 at its other end also in close proximity to the handhold portions 24 of handles 20, the rod being supported by the cross bar 25.

The cultivator B, in the example shown, comprises an elongated, horizontally disposed, primary frame 31 secured in any suitable manner to the draw bar support means 19, so as to extend rearwardly of the tractor with the longitudinal axis of the frame 31 longitudinally of the axis of the tractor; castor wheel means 32 supporting the rear portion of the frame 31; an elongated, normally horizontal, secondary frame 34 pivotally connected with the primary frame 31, adjacent to the forward end portion thereof, as by brackets 35 and horizontal pins 36, the axes of which are crosswise the frames 31 and 34 whereby the frame 34 may be swung upwardly from the normal horizontal position about the axes of pins 36; a carriage or cross head 37 supported by and reciprocable longitudinally of the secondary frame 34; a hoe 38 revoluble about a vertical axis, such as the axis of a shaft or spindle 40 supported by the carriage 37; means 42 for reciprocating the carriage 37; means 44 for rotating the hoe 38 by rotation of the spindle 40; motion transmitting means 45 operatively connected with the power take-off shaft for operating means 42 and 44; an operator's station 46 at the rear portion of the primary frame 31, in the example shown, including an operator's seat 47 in convenient proximity to the handhold portions 24 of the handles 20, and the levers 23 and knob 30; and means 48 for normally retaining the secondary frame 34 in a horizontal position and for elevating the frame 34 about the axes of pins 35 as when the tractor is being moved to and from the field and when turning at the ends of rows during the cultivating operations.

Referring first to the primary frame 31, more in detail, it preferably comprises a rectangular draw bar plate 50 which is mounted upon the draw bar support means 19 and may extend rearwardly from beneath the casing 15 as shown in Figs. 1, 2 and 3; a pair of longitudinally extending stringers 51, preferably of angular cross section each with one of its flanges 52 horizontal and its other flange 53 vertical, the forward ends of the stringers having their horizontal flanges mounted upon the top side marginal portions of the plate 50, and their vertical flanges engaging laterally the sides of plate 50 and portions of outer faces of draw bar support means 19; and a rear cross bar 55 connected to the rear end portions of stringers 51. The operator's seat and the means 48 are conveniently supported by the bar 55.

In order that the primary frame 31 will be supported at its rear end and so that it may follow a curved path in which the tractor may be steered by control means 22, the caster wheel means is provided comprising two wheels 57 to trail in the paths taken by the traction wheels 16. These wheels 57 are each provided with a trailing bracket 58 the forward end of which is pivotally connected to the rear end portion of frame 31 by an upright spindle 59 received in sleeve 60 secured in upstanding relation upon its respective stringer 51. Any suitable anti-friction bearings, not shown in the drawings, may be associated with the spindle 59 and sleeve 60 to permit the wheel to freely and substantially trail in the path of its respective traction wheel. Suitable diagonal braces 56 may be connected one to each sleeve 60 at its upper portion, the brace extending forwardly and having its lower end secured to the adjacent stringer 51, as shown in Fig. 1.

Referring now to the secondary frame 34, in the example shown, it comprises two parallel rods 61 circular in cross section, serving as stringers or a track for the cross head or carriage 37; a cross bar 62 connecting the rear end portions of rods 61; and a suitable cross brace 63 secured to rods 61 located adjacent the front ends thereof and the brackets 35, this cross brace preferably being mainly a plate horizontally disposed to partially support means 42 and 45.

The carriage or cross head 37 preferably comprises relatively deep, parallel, vertically disposed front and rear cross plates 64 and 65, respectively, the end portions of which have secured thereto bearing bushings 66 through which pass the rods 61; and upper and lower horizontally disposed bearing plates 67 and 68, secured in bridging relation to the upper and lower intermediate portions, respectively of the plates 64 and 65. Thus the carriage may be reciprocated longitudinally of the secondary frame 34 toward the front and rear portions of the cultivator.

As to the hoe 38 it constitutes an important feature of the invention for it serves to not only cultivate or chop weeds around the stalks of the plants, beneath foliage thereof, while the hoe is rotating but also to chop weeds or cultivate between the plants in the row and in the paths between the rows while not rotating, as the carriage 37 moves forwardly on its supporting frame 34. The hoe comprises a radially split hub 70 adjustable vertically on the shaft or spindle 40 and set in adjusted position thereon by clamp screw 71; a pair of elongated hoe knives 72 each having both edges sharpened as at 73 and 74; companion oppositely disposed arms 75, one for each of the knives, carried by the hub 70, and extending diametrically opposite one another, each arm having a first portion 69 made in two companion sections 76 and 77 extending laterally from the hub 70, the section 76 being secured to the hub, and the section 77 adjustably secured to section 76 by bolts 78 and nuts 79, and a second portion 80 extending downwardly from the portion 76, whereby the arms may be disposed in straddling relation to the plant; and any suitable means 81 for pivotally supporting one of the knives by its respective arm, such as opposite, upstanding, transversally spaced ears 82 rigid with each blade, opposite, upstanding, spaced apart ears 83 rigid with the lower end portion of the arm and disposed in frictional contact with and between the ears 82, a bolt 84 extending through perforations in the ears 82 and 83, as shown in Fig. 10, a nut 85 on bolt 84 opposite its head 86 and a spacing sleeve 87 between the ears 83. The bolts 78, as shown in Figs. 8 and 9, may have their shanks extending through perforations 88 in section 76 and through an elongated slot 89 in section 77, whereby the over-all length of the portion 76 may be increased or diminished to adapt the hoe for thorough cultivation according to the space between plants in the row, and the spacing of the adjacent rows. The knives 72 are placed in spaced apart end-to-end relationship a distance preferably slightly greater than the diameter of the plant stalks and are intended, when used as a cultivator to engage in the plant bed. The knives may also be adjusted so as to lie in a horizontal plane, as shown by full lines in Fig. 8 or to be disposed in planes converging toward the axis of the hub, as shown by dash lines in Fig. 8 for hilling the soil about the plant stalks.

The means 42 for reciprocating the carriage 37 comprises a horizontally disposed heart, face cam 90 disposed with its groove uppermost, the groove presenting a first half throw side 91 cooperating with a roller type follower 92 and an arm 93 carrying the follower and connected to the carriage 37, for moving the latter in a rearward direction upon one-half turn of the cam in a counterclockwise direction as viewed in Fig. 2, and a second half throw side 94 cooperating with the follower 92 for moving the carriage 37 in a forward direction with respect to the cultivator upon the second half turn of the cam. In practice I have found it desirable to offset the follower carrying end of arm 93 to the side of a vertical plane common to the axis of rotation of the cam and the center of carriage 37 as shown in Figs. 2 and 3, or in other words off center against the direction of travel, otherwise a considerable resistance to change in direction of movement of the carriage is noted at the end of the forward stroke of the carriage and at the start of its rearward movement. The cam is mounted upon the cross brace 63 of the secondary frame 34 and has a vertical drive shaft 96 journaled in the brace.

Whatever means if provided for the purpose of reciprocating the carriage 37, it must be of such nature as to move the carriage rearwardly with respect to its frame 34 steadily a distance equal to the distance of steady forward movement of the cultivator as it travels a distance equal to one-half the distance of spacing of the plants in the row, or in other words of the tractor which moves the cultivator along the row of plants, during this stroke of the carriage, and according to the spacing of the plants. This is to cause the hoe to dwell above the plant while cultivation is taking place circumferentially about the stalk of the plant and throughout a circular zone extending into the space between the adjacent plants in the row and portions of the paths to each side of the row of plants. Thus, in the example shown, the throw 91 of the cam is shaped and proportioned with this in view. Likewise it is essential that the carriage be moved forward with respect to its frame 34 a distance equal to further forward movement of the cultivator during the forward stroke of the carriage, but it is not essential that this be steady since the cultivator is not then rotating but rather is disposed with its knives crosswise the row. However, a throw 94 which produces a steady forward movement of the carriage contributes to smooth operation of the cultivator.

As suitable means 44 for rotating the hoe, that is, imparting a complete turn to the spindle 40 as the carriage 37 travels through its rearward stroke and the hoe dwells or hovers over and about the plant, I provide a pinion 97 keyed to spindle 40 having a predetermined number of teeth throughout its circumference and a mutilated gear wheel 98 for cooperation with pinion having slightly less than one-half of its circumference provided with uniformally spaced apart teeth which in number may be one less than the number of pinion teeth, for meshing relation with the latter, and slightly greater than one-half of its circumference devoid of teeth. The gear wheel 98 is mounted in a drive spindle 99 journaled in the top and bottom bearing plates 67 and 68 as shown in Fig. 1. While it is not essential that the knives of the hoe extend precisely crosswise the axis of the row as the hoe moves from plant to plant I prefer to provide means 100 shown more in detail in Fig. 7 for yieldably retaining the hoe with its blades or knives in such crosswise position as the portion of the mutilated gear wheel 98, devoid of teeth, rotates with respect to the pinion. This means 100 comprises a round collar 101 keyed to spindle, the collar having a substantially semi-spherical recess 102 open to its periphery and located to confront the carriage rear cross plate 64 when the hoe knives are in the crosswise position; a plunger 103 slidable in a cylindrical casing 104, secured to the plate 64, carrying a pin 105, having a substantially semi-spherical end, extending through an opening 107 in the end of casing 104 nearest the collar 101, the semi-spherical end adapted to ride on the periphery thereof or enter the recess 102; and an expansion spring 108 in casing 104 acting upon the plunger 103 and against an adjusting screw 109 in screw threaded relation with the bore of cylindrical casing 104.

Thus, a brake, so to speak, to check further rotation of spindle 40, due to attained momentum, after the mutilated gear has left meshing relation with the pinion, is provided. The recess 102 may be of a diameter larger than the width of any tooth of the pinion 97 so that if the mutilated gear imparts slightly more or slightly less than a full turn to spindle 40 before the teeth of the mutilated gear leave meshing relation with the teeth of the pinion, the spring biased pin 105 entering the recess 102 will rectify this slight inaccuracy of means 44.

The motion transmitting means 45 for operating the hoe spindle 40 and the cam drive shaft 96 preferably comprises a pinion 110 secured to the power take-off shaft 18; a gear wheel 112 on a counter-shaft 113 supported by a bracket 114 mounted on the draw bar plate 50; a clutch comprising companion parts 115 and 116, the former fixed to shaft 113 and the latter keyed for sliding movement on an aligned driven shaft 117; a universal joint comprising companion parts 118 and 119, the former of which is rigid with shaft 117 and the latter rigid with a shaft 120 supported by a bearing plate 121 secured to and depending from the cross brace 63; a pair of like, right angularly related bevel gear wheels 122 and 123, the former rigid with shaft 120 and the latter rigid with cam drive shaft 96 for imparting movement of shaft 120 to shaft 96; telescopically splined shafting including a sleeve shaft portion 124, aligned and rigid with shaft 120, provided with the usual internal, longitudinally extending keyways 125 shown in Fig. 6, and a male shaft portion 126 provided with integral splines 127 slidable in keyways 125, the male shaft portion provided with a non-splined portion 128 carried by a bearing 129 in front cross plate 65 of carriage 37; and, a pair of like, right angularly related bevel gear wheels 130 and 131, the former rigid with shaft portion 128 and the latter rigid with the drive spindle 99 of mutilated gear wheel 98. The clutch part 116 is provided with a hub 133 having a circumferentially extending groove 134 for cooperation with the conventional yoke 135 of a clutch operating lever 136 pivoted intermediate its ends, as at 137 to a bracket 138 secured in any suitable manner to the gear set housing 15. The lever 137 is shown provided with an operating rod 140, pivoted as at 141 to the end of lever 137 opposite the yoke 135, this rod extending to the operator's station 46 where it is provided with a handle 142 and notches 143 open to its underside for cooperation with a slotted retained clip 144 secured to the cross bar 25. Thus by manipulation of the handle 142 the operator may shift the clutch parts 115 and 116 to and from clutching relationship. The universal joint parts 118 and 119 are so disposed that the axis common to the pins 36, which pivotally connect the secondary frame 34 to the primary frame 31, intersects the operative center of the universal joint.

Thus the secondary frame may be swung upwardly about the axis of pins 36, as when traveling to and from the field, elevating the hoe a suitable distance from the ground, such as six inches, to avoid contact with small objects which may be in the road. This arrangement also enables the operator to cause the cam to rotate while the secondary frame is thus elevated and throw out the clutch when the hoe blades or knives are in proper position for the start of cultivation at the first plant in a row as hereinafter described.

The means 48 for normally retaining the secondary frame 34 in a horizontal position, and for elevating it when such is desired may comprise a hand lever 146 pivotally carried by the rear cross bar 55 of primary frame 31 the lever being provided with any approved detent mechanism including a handle 147 for operating the same and cooperating with a notched quadrant 148 also carried by bar 55 and the lever 146 also provided with a downwardly and forwardly extending arm 149; and a link 150 pivotally connected to the arm 149, and to the cross bar 62 of the secondary frame 34.

The invention may be adapted for cultivation of plants spaced apart a uniform distance in the plant row, using a tractor, by first determining the ratio between the peripheral movement of either traction wheel of the tractor, when moving forwardly, with respect to the circumferential movement of the power take-off shaft of the tractor. Knowing the distance between the plants, speed reducing motion transmitting means is then provided, so as to actuate the hoe carriage and the hoe in the following cycle of movement from one plant to another, determined, in the example shown, by the size of the cam. For each forward movement of the tractor a distance equal to one-half the distance between the plants, the hoe carriage 37 is moved rearwardly on its frame 34 one stroke, during which the hoe spindle 40 is revolved while the revolving hoe spindle dwells above the plant, and during movement of the tractor a distance equal the remaining one-half distance between the plants, the hoe carriage 37 is moved forwardly on its frame 34 one stroke, during which the hoe does not revolve but rather is disposed with its blades crosswise the path of travel of the tractor and cultivator, chopping or cutting the weeds, and loosening the soil between the plants and at least one-half of the path to each side of the row of plants.

I have found the heart, face cam 90 to be highly successful as a motion transmitting medium, since the operator may readily observe the location of the follower 92 with respect to the cam, useful in determining the location of parts for successful operation at the start of a row of plants, yet there are other types of power transmission elements, such as yoke cams, end cams, etc. which may be shaped to accomplish the object in view, that is, to have the hoe spindle 40 dwell over the plant while rotating to cultivate about the plant stalk and to bodily move the hoe forwardly to the next plant while not rotating, as the tractor and cultivator moves forwardly.

As an example, using a heart cam, if the plants are spaced apart in the row fifteen inches, and for each fifteen inches of peripheral travel of the traction wheels of the tractor in a forward direction, the power take-off shaft 18 of the tractor makes five revolutions, the speed ratio between the power take-off shaft 18 and the heart cam, would be 5:1. Thus as the tractor and cultivator moves seven and one-half inches longitudinally of the row of plants, the hoe carriage is moved by the cam rearwardly with respect to its carrying frame seven and one-half inches so as to cause the hoe to have an orbit of rotation about the plant with its blades circling about the stalk of the plant as axis. Then, during the remaining seven and one-half inches of forward movement of the tractor and cultivator longitudinally of the row, the hoe carriage is also moved forwardly with respect to its supporting frame seven and one-half inches making up for the loss in advance while dwelling over the plant.

When using the cultivator, the operator approaches the starting end of a row of plants with the hoe elevated. If the hoe blades are in position crosswise the axis of the row, the mutilated gear is in position to start rotating the hoe, and the cultivator clutch is in a thrown-out position, the operator can then lower the secondary frame 34 to normal position, operate the tractor to a position where the hoe blades are in proper relation to the first plant for cultivation thereof, and then simultaneously throw in the clutch of the tractor and the clutch of the cultivator. If in the initial approach to the starting plant in the row, the hoe blades are not crosswise the axis of the row, by stopping the tractor, and with the secondary frame elevated, throw in the clutch of the cultivator and by watching the relative position of the cam follower to the proper throw of the cam, throw out the cultivator clutch at the precise time when the carriage 37 is in its foremost position on its frame 34 at which location the teeth of the mutilated gear wheel 98 will have a position in readiness to operate the pinion 97. Then the operator may proceed as above described and continue cultivation until completing that row. The procedure to cultivate succeeding rows will be clear from the above description.

While the invention is herein described as particularly adapted for use as a cultivator, it may also be used as plant-thinning machine when seeds, such as cotton, beets, and other crops, are drilled thick along the row to get a good stand.

I claim:

1. In combination with a mobile power operated unit for movement along a plant row; a cultivator for the plants in the row, comprising an elongated horizontally disposed frame adapted to travel with said mobile unit and with the longitudinal axis of the frame disposed longitudinally of the row; a carriage supported by said frame and reciprocable longitudinally thereof; a hoe revoluble about a vertical axis, supported by said carriage and including two radially disposed blades in end-to-end relationship spaced apart a distance slightly greater than the diameter of the plant stalks in the row, said blades normally engaging in the plant bed; means operated by said mobile unit during forward movement of the mobile unit along the row, for reciprocating said carriage forwardly and rearwardly on said frame; and, means operated by said mobile unit and during its forward movement for rotating said hoe about the vertical axis during rearward movement only of said carriage on its said supporting frame.

2. The combination of claim 1 in which said mobile power operated unit is a tractor including a power take-off and said means for reciprocating said carriage and for rotating said hoe are operatively connected with said power take-off.

3. The combination of claim 1 including means for elevating said frame with respect to said mobile power operated unit to withdraw said blades fom the plant bed as when turning the tractor and cultivator at the end of the plant row.

4. The combination of claim 1 including means for yieldably retaining said hoe with its blades crosswise the axis of the plant row during forward movement of said carriage.

5. The combination of claim 1 in which said first mentioned means comprises a heart cam and a cooperating follower connected with said carriage, and disposed to cause one-half of the throw of the cam to impart rearward movement of the carriage with respect to said frame, and the other half of the throw of the cam to cause forward movement of the carriage with respect to said frame during a complete revolution of the cam and during forward movement of the mobile power operated unit.

6. The combination of claim 1 in which said means for reciprocating said carriage includes a universal joint and said frame is pivotally connected with the mobile power operated unit to swing about a horizontal axis intersecting the center of said universal joint, whereby said frame may be elevated to withdraw the blades of said hoe from said normal position as when turning the tractor and cultivator at the end of the plant row.

7. The combination of claim 1 in which said hoe includes a vertical shaft, a hub adjustable vertically on said shaft and arms extending from said hub in straddling relation to the plants and to the lower end portions of which arms, said blades are connected.

8. The combination of claim 7 in which said arms each includes means for adjustment thereof radially of the axis of the shaft.

9. The combination of claim 7 in which said blades are pivotally connected to the lower portions of said arms and including means for adjustably retaining the blades either parallel to or in angular relation with the horizontal.

10. The combination of claim 1 in which said last mentioned means includes a pinion connected with said hoe to rotate same about said vertical axis, and a mutilated gear wheel for cooperation with said pinion, disposed so that the teeth of the mutilated gear are in meshing driving relation with the teeth of said pinion only during rearward movement of said carriage on its said supporting frame.

11. In combination with a tractor of the garden type including two power driven ground wheels which may be separately braked for steering purposes, a power take-off, and draw bar support means at the rear portion of the tractor; a cultivator for row plants, comprising: an elongated, horizontally disposed primary frame secured to said draw bar support means and extending rearwardly of the tractor with its axis longitudinally of the axis of the tractor; caster wheel means supporting the rear portion of said frame; a clutch carried by said primary frame, comprising two parts one of which is operatively connected with said power take-off to be rotated thereby; a universal joint comprising two parts one of which is connected with the other of said parts of the clutch to be operated thereby; an elongated, normally horizontal secondary frame pivotally connected with said primary frame to swing upwardly and downwardly about a transverse horizontal axis intersecting the center of said universal joint; a carriage supported by said secondary frame and reciprocable longitudinally thereof; a hoe revoluble about a vertical axis, supported by said carriage and including two radially disposed blades in end-to-end relationship spaced apart a distance slightly greater than the diameter of the plant stalks in the row, said blades normally engaging in the plant bed; means operatively connected with the other part of said universal joint for reciprocating said carriage forwardly and rearwardly on said secondary frame as the tractor moves forward; means operatively connected with said last mentioned part of said universal joint for rotating said hoe about the vertical axis during rearward movement only of said carriage; and an operator's station carried by said primary frame including means for manually engaging and disengaging said clutch parts and means for normally retaining said secondary frame in position with said blades of the hoe in the plant bed during forward movement of the tractor along the plant row and for elevating said secondary frame about its pivotal connection with said primary frame, for elevating said hoe knives from the plant bed at the end of the row.

12. In combination with a tractor of the garden type including two power driven ground wheels, and a power take-off; a cultivator for row plants, comprising: an elongated, horizontally disposed primary frame connected in trailing relation to said tractor; ground wheel means supporting the rear portion of said frame; motion transmitting means operatively connected with said power take-off and including a universal joint; an elongated, normally horizontal secondary frame pivotally connected with said primary frame to swing upwardly and downwardly about a transverse horizontal axis intersecting the center of said universal joint; a carriage supported by said secondary frame and reciprocable longitudinally thereof; a hoe revoluble about a vertical axis, supported by said carriage and including radially disposed blades in end-to-end relationship, spaced apart a distance slightly greater than the diameter of the plant stalks in the row, said blades normally engaging in the plant bed; means operatively connected with said motion transmitting means for reciprocating said carriage forwardly and rearwardly on said secondary frame as the tractor moves forward; means operatively connected with said motion transmitting means for rotating said hoe about the vertical axis during rearward movement only of said carriage; and means for normally retaining said secondary frame in said horizontal position with the blades of the hoe in the plant bed during forward movement of the tractor along the plant row, and for elevating said secondary frame about its pivotal axis with said primary frame, for elevating said hoe knives from the plant bed at the end of the row.

References Cited in the file of this patent

UNITED STATES PATENTS

| 980,803 | Lackie | Jan. 3, 1911 |
| 2,422,729 | Helbig | June 24, 1947 |
| 2,610,559 | Peel | Sept. 16, 1952 |
| 2,638,831 | Ferguson et al. | May 19, 1953 |

FOREIGN PATENTS

| 217,405 | Switzerland | Feb. 2, 1942 |